United States Patent [19]

Chang et al.

[11] 4,050,033
[45] Sept. 20, 1977

[54] SUBMILLIMETER WAVE AND FAR INFRARED MOLECULAR LASERS AND POLYATOMIC BUFFER GASES THEREFOR

[75] Inventors: Tao-Yuan Chang, Lincroft; Chinlon Lin, Matawan, both of N.J.

[73] Assignee: Bell Telephone Laboratories, Incorporated, Murray Hill, N.J.

[21] Appl. No.: 631,225

[22] Filed: Nov. 12, 1975

[51] Int. Cl.$^2$ .................................................. H01S 3/00
[52] U.S. Cl. .......................... 331/94.5 G; 331/94.5 PE; 331/94.5 P; 330/4.3
[58] Field of Search ......... 331/94.5, 94.5 G, 94.5 PE, 331/94.5 P; 330/4.3

[56] References Cited

U.S. PATENT DOCUMENTS

| | | | |
|---|---|---|---|
| 3,628,174 | 12/1971 | Bridges et al. | 331/94.5 |
| 3,813,612 | 5/1974 | Schriever et al. | 331/94.5 G |
| 3,826,997 | 7/1974 | Javan et al. | 331/94.5 G |
| 3,934,212 | 1/1976 | Javan et al. | 331/94.5 G |

OTHER PUBLICATIONS

Robinson, Science, vol. 184, June 7, 1974, pp. 1062-1064.
Diubko et al., Int'L Aerospace Abstract No. A6-9-15175, p. 612, 1969.

*Primary Examiner*—Martin H. Edlow
*Attorney, Agent, or Firm*—Daniel D. Dubosky

[57] ABSTRACT

The optically pumped submillimeter wave lasers employing molecular gases having dipole moments are improved by employing as a polyatomic buffer gas a molecular gas or vapor of a hydrocarbon having a significantly large vibrational heat capacity in relation to its molecular weight. An example is $C_6H_{14}$ added to such lasers as the methyl fluoride laser at 496 micrometers. Other examples of saturated hydrocarbon buffers are also given; and in each case the vapor molecule is complex enough to absorb many vibrational quanta from the active molecules, yet is small enough to move rapidly to the tube walls.

6 Claims, 8 Drawing Figures

CH₃F + He

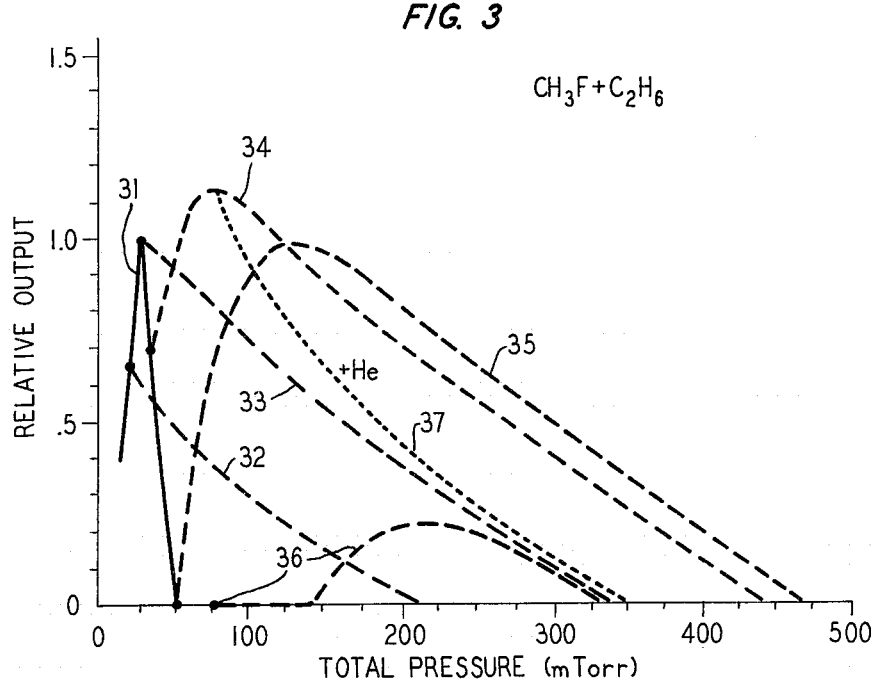
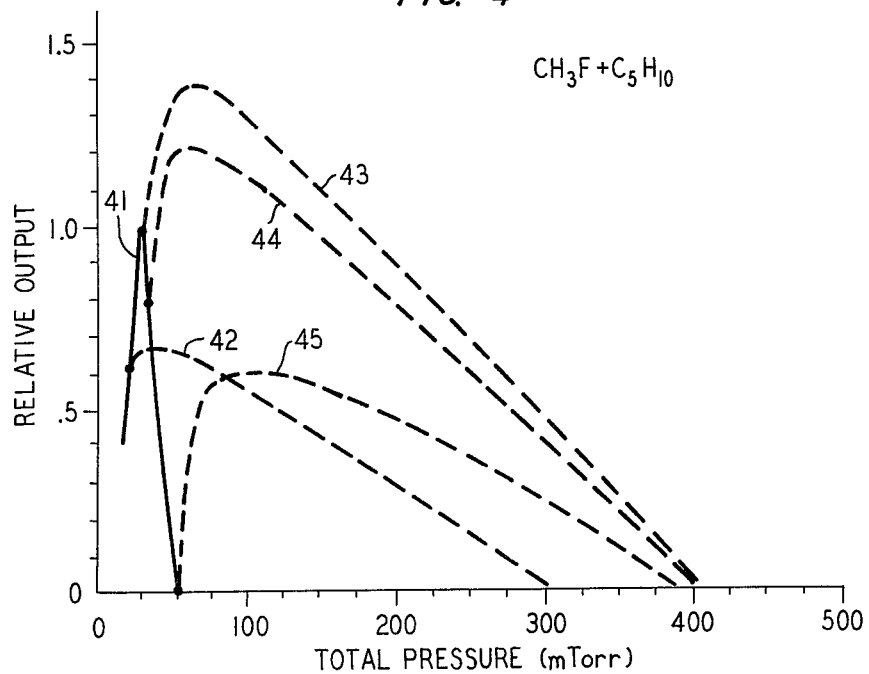

SUBMILLIMETER WAVE AND FAR INFRARED MOLECULAR LASERS AND POLYATOMIC BUFFER GASES THEREFOR

BACKGROUND OF THE INVENTION

This invention relates to submillimeter wave and far infrared molecular lasers and molecular laser amplifiers.

The region of the spectrum between roughly 3 millimeters wavelength and 30 micrometers wavelength, hereafter called the submillimeter portion, has been relatively inaccessible for experimentation with coherent radiation except for the optically pumped molecular lasers disclosed in U.S. Pat. No. 3,628,174 on Dec. 14, 1971 to T. J. Bridges and one of the present inventors, Tao-Yuan Chang.

The usefulness of such sources throughout the submillimeter wave range depends in part upon the power and efficiency of the laser transitions that can be utilized. Particularly for the weaker transitions that have been discovered in this region of the spectrum, it would be useful to increase the power and efficiency of the laser operation on such transitions.

SUMMARY OF THE INVENTION

According to our invention, the optically pumped gas lasers of the above-cited patent are improved by employing as an additive thereto a molecular gas or hydrocarbon vapor having a significantly large vibrational heat capacity in relation to its molecular weight. The typical measure of the significance of the vibrational heat capacity relative to its molecular weight can be obtained by using as a standard the performance obtained with a saturated hydrocarbon such as n-hexane. In this context the additives mentioned in the above-cited patent, that is helium, $PF_5$ and $SF_6$, are much less effective in improving the laser performance because He, though light in molecular weight, has no vibrational heat capacity, while $PF_5$ and $SF_6$, though large in their vibrational heat capacities, cannot move rapidly to the tube walls due to excessively large molecular weights.

A particular feature of our invention is the use of n-hexane, $C_6H_{14}$, as an additive. It is highly advantageous for use with many rotational transition gas lasers.

Two other species of the invention are noteworthy. Ethane has the advantage that it can be mechanically pumped out of the laser without a cold trap. Cyclopentane is best for pulsed operation of lasers pumped at wavelengths outside the 10 micrometer region. An alternative method of specifying large vibrational heat capacity in relation to molecular weight in a hydrocarbon vapor is in terms of the ratio of hydrogen to carbon atoms in the illustrative embodiments. N-hexane, ($C_6H_{14}$), the preferred embodiment, has a ratio of 2.33, ethane ($C_2H_6$) has a ratio of 3, and cyclopentane ($C_5H_{10}$) has a ratio of 2. A precise condition of essentially the same scope might be made by using this ratio, taking cyclopentane as the last compound covered. Applicants understand the class "a saturated hydrocarbon of the type $C_mH_n$ where $n$ is greater than or equal to $2m$" to have the same meaning as the class "a hydrocarbon vapor having a significantly large vibrational heat capacity in relation to its molecular weight."

BRIEF DESCRIPTION OF THE DRAWING

Further features and advantages of our invention will become apparent from the following detailed description, taken together with the drawing, in which:

FIGS. 3 through 5 show the performance of lasers according to the present invention employing various hydrocarbons.

DESCRIPTION OF ILLUSTRATIVE EMBODIMENTS

Figure 1:
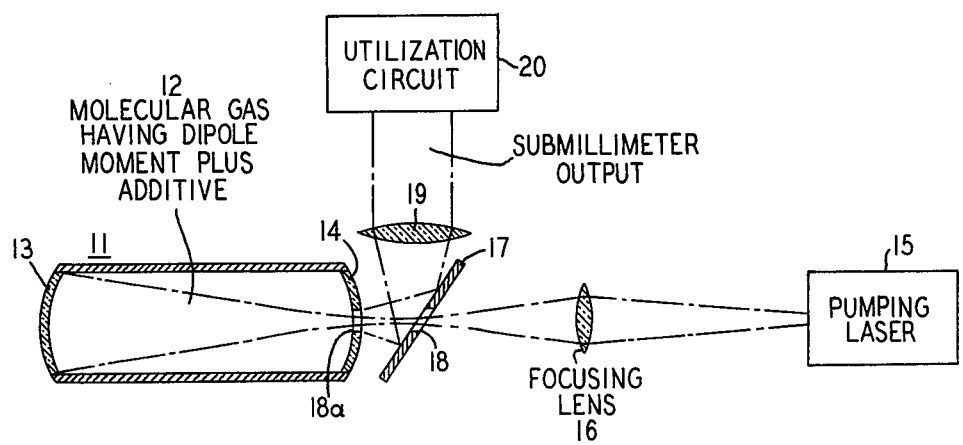
FIG. 1 shows typical apparatus in which lasers according to our invention are operated.

In FIG. 1, the appearance of the laser apparatus may be seen to be essentially similar to that of the above-cited patent application with the exception that the gas mixture 12 includes additives according to the present invention. In particular, submillimeter-wave oscillation is provided in an apparatus 11 in which methyl fluoride ($CH_3F$) gas 12 and an additive according to the present invention is pumped by infrared light reflected between the back reflector 13 and front reflector 14. The apparatus 11 may have its axis slightly misaligned with respect to pumping source 15 to allow multiple non-reentrant passage of the pump between reflectors 13 and 14 without substantial back-coupling to the laser pumping source 15. The pumping light is focused by a lens 16 through a coupling hole 18 in the metallic 45° reflector 17 and coupling hole 18a in reflector 14. The hole 18a also provides output coupling for the submillimeter oscillation. Because of strong diffraction at the comparatively long wavelength, the beam diverges strongly; and the hole 18 provides substantially no loss for the submillimeter-wave stimulated radiation, nearly all of the latter being reflected from mirror 17 and focused by lens 19 into utilization apparatus 20. The reflectors 13 and 14 are illustratively gold coated and form a resonator at the submillimeter wavelengths.

The utilization apparatus 20 could include a sample of material (to be investigated) and spectrometer, as employed in molecular spectroscopy.

The pumping laser source 15 is illustratively a carbon dioxide molecular laser of known type oscillating at 9.55 μm, a wavelength at which the methyl fluoride gas in laser 11 has a vibrational-rotational absorption.

A vibrational-rotational absorption involves a transition between different vibrational levels, each of which includes several rotational levels. Typically, the absorbing transition occurs between one rotational level of one lower vibrational level and one rotational level of a higher vibrational level.

In contrast, each pure rotational transition upon which oscillation occurs in laser 11 is a transition between a rotational level of that higher vibrational level and another rotational level of that same vibrational level.

It should be understood that several other active gases, in each case a molecular gas having an electric dipole moment, can be used in modified embodiments of our invention by addition of the suitable additive having a significant vibrational heat capacity and being sufficiently compatible with the lasing gas, particularly being sufficiently light, to be able to move to the tube walls rapidly.

The optically pumped $CH_3F$ laser operating at 496 μm is a representative member of a large family of optically pumped far infrared (FIR) lasers that have emerged in the last few years. These lasers are typically pumped by a CO₂ laser which excites the active molecules into a specific rotational level of an excited vibrational state. Laser action in the far infrared takes place when these excited molecules undergo a transition to the next lower rotational level. In this way either kW-level short pulses or mW-level cw output at numerous wavelengths throughout the FIR region can be generated. The photonconversion efficiency of these optically pumped lasers has, however, been found to be on the order of only a few percent or less. This low efficiency is largely caused by the combination of a rapid rotational relaxation and a much slower vibrational relaxation of the active molecules. One possible way to overcome this bottleneck is to use a buffer gas to improve vibrational relaxation of the active molecules.

Our experimental investigation of the effects of various buffer gases tested the performance of a 5-cm-bore $CH_3F$ laser. Under continuous-wave conditions and constant pump power, as much as 55 percent improvement on the conversion efficiency has been observed by the addition of n-hexane as the buffer gas. The use of such a buffer gas also shifts the optimum operating pressure of the laser to a higher value. Similar results are also observed in pulsed operation with 350 μsec pulse width.

To help elucidate the physical mechanisms behind the observed buffer gas effects and their dependences on the operating conditions and buffer molecule properties, we have derived theoretical expressions giving the effect of a small amount of buffer gas on the laser gain. These expressions also provide general guidelines to the use of buffer gases under operating conditions different from the present experiment or in other optically pumped far infrared lasers.

It should be pointed out that another highly effective way to improve the performance of this type of laser is to increase the rate of vibrational de-excitation at the vessel wall by using a small-bore metal-waveguide resonator. A photon-conversion efficiency of 10 percent has been reported for 12-mm inside diameter waveguide resonator. However, once the tube diameter becomes comparable to the minimum mode diameter that can be achieved in the far infrared resonator of given length without a waveguide, waveguiding will occur. Any further reduction of the waveguide diameter will cause a rapid decrease of the mode volume and is not expected to lead to further improvement of the conversion efficiency for the same pump power. The output power may actually decrease with the decreasing waveguide diameter due to the increased waveguide loss. The optimum waveguide size is therefore dictated by the longest far infrared wavelength that one wishes to cover. The use of a buffer gas, on the other hand, does not lead to a change in the mode volume or the waveguide loss and is compatible with any far infrared resonator. Improved performance of the far infrared laser over and above that which can be achieved by the use of a waveguide resonator can therefore be obtained by the utilization of a buffer gas.

In the following sections, we shall first present the experimental results. These results will then be discussed and interpreted with the help of theoretical expressions.

Experimental

The experimental apparatus is as follows: The excitation source 15 is a CO₂ laser which is tuned with a grating to the 9.55-μm P(20) line. The $CH_3F$ gas is flowed through a far infrared resonator with internal mirrors 13 and 14 which are normally separated by 77 cm. One of the resonator mirrors has a 1.6 mm hole 18a at the center to admit the 9.55-μm pump beam into the resonator as well as couple out the 496-μm signal generated in the resonator. The resonator is designed to trap the pump beam for a large number of round trips between the two mirrors so that the pump power can be efficiently absorbed at low gas pressures. In our experiments, the 496-μm signal is detected with a liquid-helium-cooled InSb hot-electron bolometer, which served as utilization apparatus 20.

For most of the experiments, the output from the CO₂ laser consists of long and approximately square pulses of 5-msec duration at the rate of 20 pps and a peak power of 3W. Since this pulse duration is longer than the time required for a $CH_3F$ molecule to diffuse across the radius of a 5-cm-bore tube at pressures of our primary interest (<350 mTorr), an essentially cw condition exists at the end of each pulse. Consequently, we shall refer to this type of operation with data taken at the end of the 5 msec pulses as the cw operation. We also made a few observations with 350-μsec, 15-W pulses. These will be referred to as the pulsed operation since the pulse duration is shorter than the time required for complete vibrational relaxation of the active molecules (primarily by diffusion to the wall).

Each of the buffer gases studied is chosen with the following criteria in mind: (a) little or no absorption in the pump (10 μm) and far infrared regions; (b) a small cross-section with respect to the broadening of the $CH_3F$ laser line; (c) a high mobility and large vibrational degree of freedom for efficient transportation of energy to the wall. The first two criteria confine the choices to nonpolar molecules.

In the experiment, the far infrared output power is measured as a function of total gas pressure in the far infrared resonator as indicated by a capacitance manometer. The results of these measurements for continuous-wave operation are presented graphically in FIGS. 2 through 5 for buffer gases $C_2H_6$ (ethane), $C_5H_{10}$ (cyclopentane), and $C_6H_{14}$ (n-hexane) respectively. In each figure, the solid curve, 21, 31, 41, 51 respectively, represents the pure $CH_3F$ case. Each round dot on the solid curve indicates the starting point of a dashed curve which shows the effect of adding the buffer gas on the far infrared output power. The partial pressure of $CH_3F$ is kept constant throughout each dashed curve at the value corresponding to its starting point by maintaining a constant $CH_3F$ flow rate. Thus, each family of dashed curves, 22–27, 32–36, 42–45 and 52–56, are distinguished among themselves by different values, increasing in the numbered order, of active gas partial pressure.

The buffer gas is mixed into the gas stream just before entering the far infrared resonator vessel. Highly condensable mixtures containing $C_5H_{10}$ or heavier molecules are pumped with the help of a liquid nitrogen cold trap. Otherwise only a mechanical vacuum pump is used.

Figure 2:
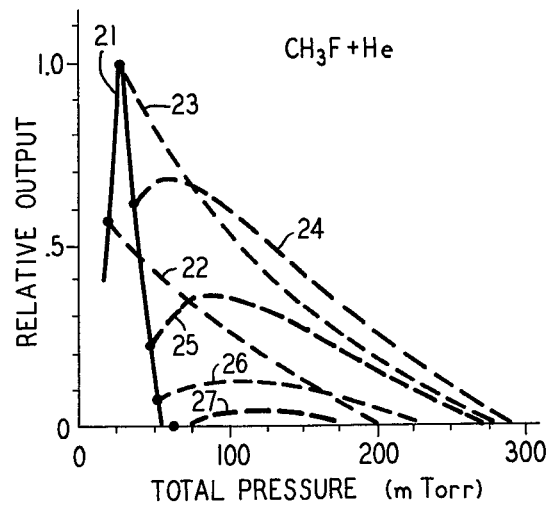
FIG. 2 shows the performance of prior art lasers disclosed in the Bridges et al patent.

With pure $CH_3F$, the far infrared output power reaches a maximum value of approximately 1 mW, normalized to unity in the figures, at a pressure of 27 mTorr and drops to zero at 52 mTorr. At pressures much lower than 27 mTorr, the laser output is low mainly because only a small fraction of the pump power is absorbed by the very tenuous active gas. Otherwise the conversion process should be quite efficient due to slow rotational relaxation and rapid diffusion of excited molecules to the resonator wall. Therefore, the buffer gases are not very likely to improve the laser performance in this very low pressure regime. At pressures ≧ 27 mTorr, substantially all the pump power is absorbed by the active gas. The conversion efficiency drops with increasing pressure due to increasingly larger rotational relaxation rate and linewidth as well as increasingly slower diffusion of excited molecules to the wall. It is primarily in this pressure regime that the beneficial effect of buffer gases is expected. Addition of helium, as shown in FIG. 2, to the $CH_3F$ makes only a slight improvement in the performance of the laser. The other additives of the above cited patent affect lasing even less.

A dramatic improvement occurs when we go to $C_2H_6$, as illustrated in FIG. 3. Approximately 14 percent higher output power, at the peak of curve 34, can be obtained with a $CH_3F$—$C_2H_6$ mixture than with pure $CH_3F$. With the addition of $C_2H_6$, the laser can even be operated satisfactorily with 75 mTorr of $CH_3F$, a partial pressure at which the pure active gas would not lase, as shown by curve 36. The molecular property that makes $C_2H_6$ so superior to He or other prior art additive as a buffer gas is presumably the much larger vibrational degrees of freedom with accordingly larger vibrational heat capacity provided at its relatively light molecular weight.

The dotted curve 37 in FIG. 3 shows the effect of adding He to the optimum $CH_3F$—$C_2H_6$ mixture. It is seen that the beneficial effects of He and $C_2H_6$ are not necessarily additive.

Figure 6:
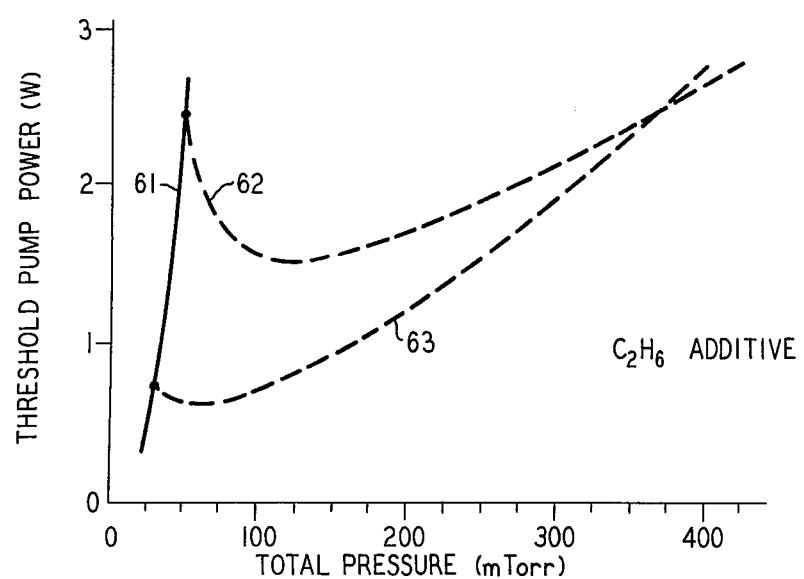
FIGS. 6 through 8 show curves and diagrams which are useful in explaining the operation of our preferred embodiment.

The effect of $C_2H_6$ on the threshold pump power is shown in FIG. 6. For pure $CH_3F$, the threshold pump power, in curve 61, raises approximately quadratically with the pressure. For a $CH_3F$ partial pressure of 50 mTorr, the threshold pump power can be reduced by about 40 percent, at the minimum of curve 62, by the addition of about 70 mTorr of $C_2H_6$. This suggests that $C_2H_6$ increases the laser gain by approximately 40 percent for a constant pump power. As expected, at a $CH_3F$ pressure of 27 mTorr, improvement is marginal, because the problem is the initial absorption of pump energy, rather than the conversion of the already absorbed pump energy.

Figure 5:
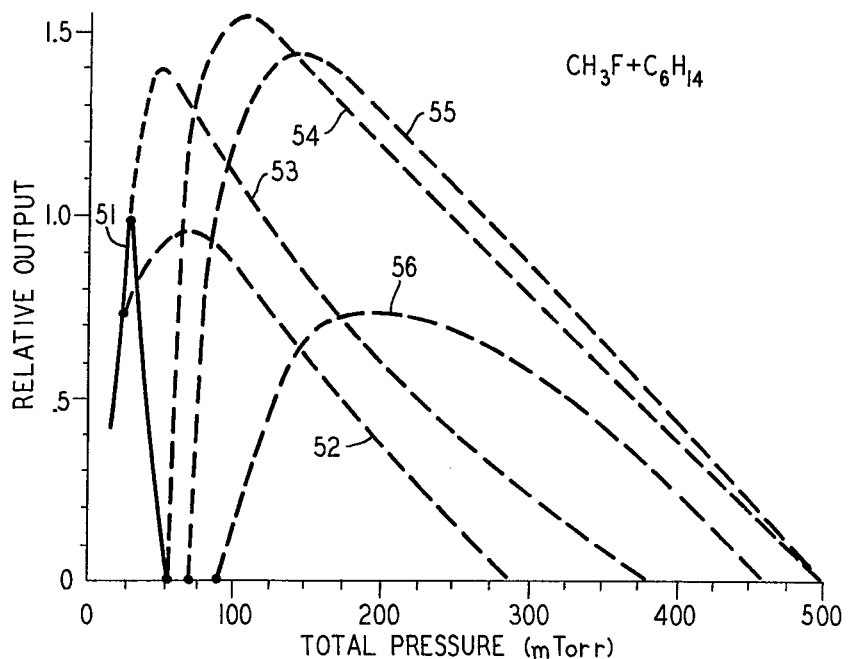

As we go from $C_2H_6$ to still heavier molecules $C_5H_{10}$ and $C_6H_{14}$, the enhancement of laser output power is further increased as is evident in FIG. 4 and FIG. 5, supporting the point of view that the vibrational heat capacity of the buffer molecule plays an important role in improving the laser performance. The output power obtained with a mixture of 53 mTorr $CH_3F$ and 53 mTorr $C_6H_{14}$ is approximately 55 percent higher, in curve 54, than the maximum power obtainable with $CH_3F$ alone at 27 mTorr. With a $CH_3F$-$C_6H_{14}$ mixture, satisfactory operation can be obtained at a partial pressure of $CH_3F$ in excess of 85 mTorr, in curve 56. These results clearly suggest that the gain-bandwidth product of the laser is also increased by the addition of a good buffer gas like $C_6H_{14}$, as the linewidth of the laser also increases at higher pressures. We have attempted to deduce the laser linewidth from the pump power dependence of the oscillation width. Unfortunately, the results are inconclusive because the lineshape appears to be highly distorted from a simple Lorentzian. This is presumably due to a large matrix element for the $\nu_3$ transition of $CH_3F$ which leads to nonlinear effects in optical pumping.

As the molecular weight of the buffer gas is further increased beyond $C_6H_{14}$ its effectiveness starts to decline. We find that $C_7H_{16}$ and $C_8H_{18}$ are somewhat inferior to $C_5H_{10}$. The effect of perfluoroalkane-80 $\{F(CF_2)_nF$, b.p. 80°–115° C$\}$ is even worse than that of $N_2$. Thus, $C_6H_{14}$ is the best buffer gas among the gases we have studied.

Figure 7:
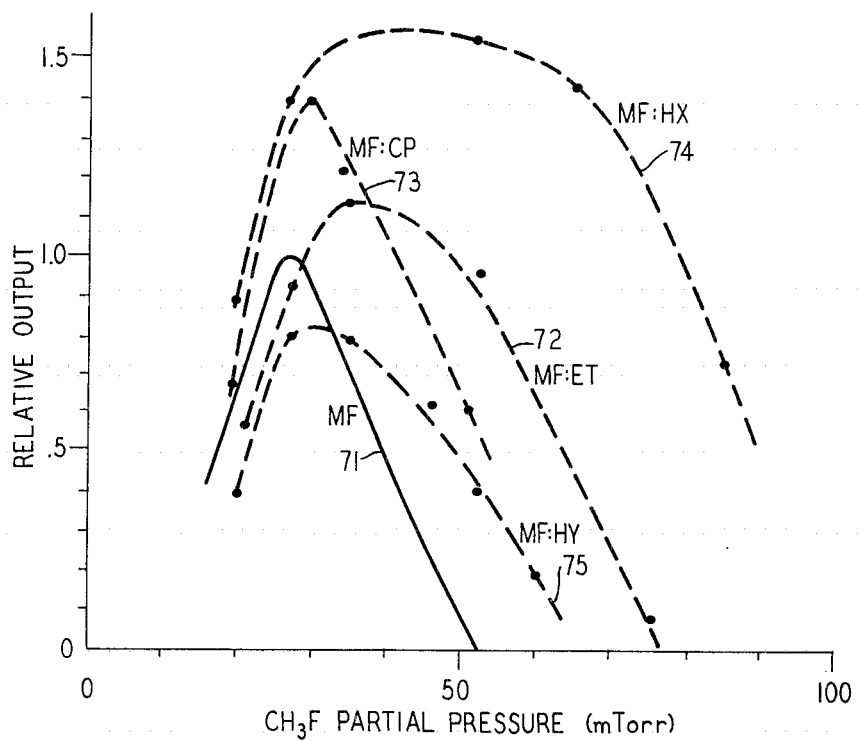

The dashed curves in FIGS. 3 through 5 indicate that the best mixing ratio between $CH_3F$ and a good buffer gas is approximately 1:1. To illustrate more clearly the differences in the performance of unbuffered and buffered $CH_3F$ lasers, we have plotted the output power against the $CH_3F$ partial pressure for pure $Ch_3F$ (curve 71) and 1:1 mixtures of $CH_3F$:$H_2$ (curve 75), $CH_3F$:$C_2H_6$ (curve 72), $CH_3F$:$C_5H_{10}$ (curve 73) and $CH_3F$:$C_6H_{14}$ (curve 74) in FIG. 7. It is apparent that the optimum $CH_3F$ (partial) pressure is increased approximately 100 percent by the addition of $C_6H_{14}$.

The effects of $C_5H_{10}$ and $C_6H_{14}$ have also been examined for pulsed operation with 350-μsec pump pulses. The enhancement of output power over pure $CH_3F$ case is approximately 50 percent for $C_5H_{10}$ and 40 percent for $C_6H_{14}$.

Discussion

The output power of an optically pumped far infrared laser containing a buffer gas depends on a large number of parameters in a rather complex manner. A complete analysis of such a problem will not only be very cumbersome, but also difficult to interpret. As an alternative, we shall present the results of a simpler analysis on the perturbational effect of a buffer gas on the gain of an optically pumped far infrared laser. The details of the mathematical derivations are unnecessary here. The final expressions are by no means simple, but can be readily interpreted in physical terms. With the help of these expressions, our qualitative discussions of experimental results can be put on a firmer analytical basis. These expressions are also sufficiently general to serve as guides to the use of buffer gases under conditions different from the present experiment.

Figure 8:
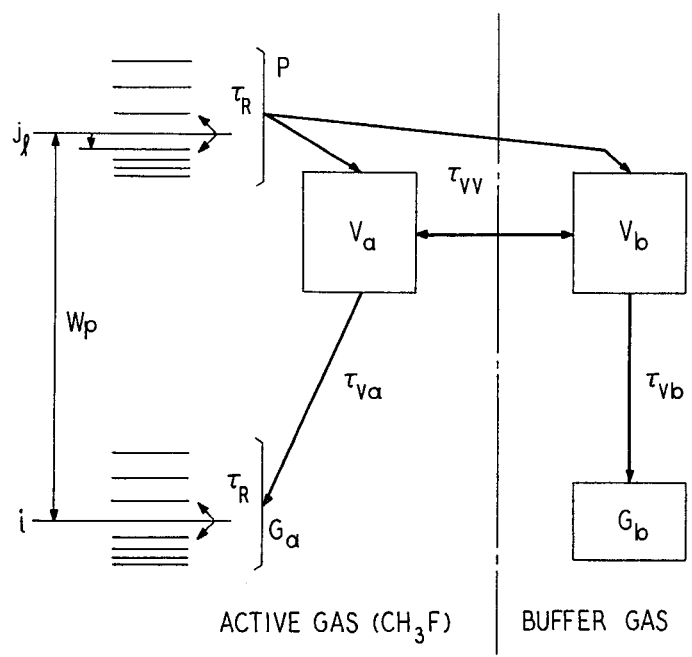

Our analysis is based on a somewhat simplified energy level diagram which is shown in FIG. 8. Active molecules are optically excited at a rate $W_p$ (in $W/cm^3$) from a rotational level $i$ in the ground vibrational state $Ga$ to a rotational level $j$ in the pumped vibrational state P. The state $Ga$ could also be a low lying vibrational state other than the ground state. The far infrared laser gain appears on the rotational transition $j \rightarrow l$. If the stimulated transition rate is small (small signal condition), then a molecule excited into level $j$ by optical pumping will remain in that level for an average duration of $\tau_R$ — the rotational lifetime. After time $\tau_R$, the molecule hops by collisions among the rotational levels in state P with the probability of finding it in any particular rotational level given by the Boltzman distribution for a rotational temperature $T_R$. The molecule remains this way in the state P for an average duration of $\tau_{vv}$ — the V—V (vibration-vibration) transfer time constant. After time $\tau_{vv}$, the molecule leaves state P by V—V transfer. Since V—V transfer only results in the transfer of vibrational energy from 1 molecule to another, most of the vibrational energy created by optical pumping is retained by the gaseous system after many V—V transfers. Consequently, the total vibrational energy in the gaseous system builds up until the pumping rate is balanced by the rate of loss of vibrational energy from the system due to molecular collisions with the resonator wall and through V—T/R (vibration to translation/rotation) transfer. These processes are usually slower, with time constant $\tau_{va}$, than most V—V transfer processes. The vibrational energy retained by the system therefore has sufficient time to thermalize and gives rise to a vibrational temperature $T_v$, which is much higher than the ambient temperature. The effects of optical pumping and buffer gas addition on the population densities of all vibrational states are largely determined by this single quantity $T_v$. Optical pumping has a much smaller effect on the rotational and translational temperatures of the gas because the pump energy is converted almost entirely into the vibration energy in the first place and because the V—T/R transfer rate is usually slower than the de-excitation rate due to collisions with the resonator wall. We shall therefore assume the rotational temperature to remain constant at the ambient value $T_o$.

To give a numerical example, a 50 mTorr of pure $CH_3F$, the value of $\tau_R$ is 0.2 μsec, while the value of $\tau_{vv}$ ranges from 40 μsec to 2 msec, the molecular diffusion time across a 2.5 cm radius is 0.7 msec, and the V—T/R transfer time is 34 msec. The combined effect of the diffuse rate (which decreases with the gas pressure) and the V—T/R rate (which increases with the gas pressure) is represented in FIG. 4 by the vibrational deactivation of time $\tau_v$. For simplicity, $\tau_{vv}$ is assumed to have a single value corresponding to the fastest V—V rate (i.e., the transfer rate among near-resonant and harmonic vibrational states) in our analysis. The final result should be qualitatively correct provided that one interprets it with the understanding that only those vibrational states effectively coupled to the state P through V—V transfers with $\tau_{vv} < \tau_v$ (or the pulse duration, whichever is shorter) are considered and are included in the vibrational heat content and heat capacity of the gaseous system.

The inversion density $\Delta n$ between levels $j$ and $l$ is given by $$\Delta n = W_p \tau_R / h\nu_p - n_p \Delta f_t \quad (1)$$

where $\nu_p$ is the pump frequency, $n_p$ is the rotationally thermalized part of the population density of state P, and $n_p \Delta f_t$ is the thermal population difference between levels $l$ and $j$. The positive quantity $\Delta f_t$ is given by $$\Delta f_t = f g_j/g_l - f_j$$
$$= f_j \{\exp(h\nu_{jl}/kT_o) - 1\} \quad (2)$$

where $f_x$ is the fraction of $n_p$ in level $x$, $g_x$ is the degeneracy factor for level $x$, and $\nu_{jl}$ is the frequency of the $j \rightarrow l$ laser transition. The second term in Equation (1) is a negative term and hence should be made as small as possible (by minimizing $n_p$) for good laser performance. For a given density $n_a$ of the active molecules, the value of $n_p$ is determined by the pumping rate $W_p$ and the vibrational temperature $T_v$. Consequently, reduction of $T_v$ is the key to the improvement of laser performance. The vibrational temperature can be reduced by the use of a buffer gas through two possible mechanisms. The first is to remove vibrational energy from the active molecules by V—T/R transfer to buffer molecules. The second is to transfer vibrational energy from active molecules to buffer molecules that have a larger capacity to transport vibrational energy to the wall than the active molecules.

We obtain an expression for the laser gain in a mixture of an active gas and a small amount of simple buffer gas as follows:

$$\gamma = (G\Delta n_a/\beta_a n_a)\{1-[2+(n_{p1}\Delta f_t/\Delta n_1)](\beta_b/\beta_a)(n_b/n_a)$$
$$+ (n_{p1} - W_p\tau_{vv1}/h\nu_p)(\Delta f_t/\Delta n_1)(h\nu_p - \overline{H}_{al})$$

$$\cdot (\overline{H}_{al} - \overline{H}_{ao})(kT_v^2 \overline{C}_{al})^{-1} \tau_{val} k_{ab} n_b\} \quad (3)$$

where $G$ is a numerical factor, subscripts $a$ and $b$ refer to active and buffer molecules respectively, subscripts $o$ and $l$ and used respectively for values in the absence of pumping and in the presence of pumping before the addition of any buffer gas, $\beta_x$ is the line broadening coefficient for species $x$, and $\overline{H}_x$ is the effective vibrational heat content per molecule of species $x$, $\overline{C}_a = d\overline{H}_a/dT_v$ is the effective vibrational heat capacity per active molecule, and $k_{ab}$ is the coefficient of vibrational deactivation of active molecules due to buffer molecules defined by the relation $$\tau_{va}^{-1} = \tau_{val}^{-1} + k_{ab} n_b. \quad (4)$$

The broadening coefficients are defined through the following relation, $$\Delta \nu = \beta_a n_a + \beta_b n_b \quad (5)$$

where $\Delta \nu$ is the full width at half maximum of a homogeneously broadened far infrared laser line.

The second term inside the curly brackets in Equation (3) is always negative and reflects the fact that the addition of any gas to the system invariably increases the laser linewidth and reduces the rotational lifetime, both of which tend to decrease the laser gain. It is therefore important to keep $\beta_b << \beta_a$ by using only buffer molecules with very small or no permanent dipole moment. The positive contribution of a buffer gas to laser gain comes entirely from the last term in Equation (3), which is proportional to $k_{ab}$ (which is largest for $H_2$ and smaller for heavier buffer molecules). In order for the performance of a far infrared laser to be improved by the addition of a buffer gas, the last term inside the curly brackets must be greater than the second term. This is most likely to occur when $\tau_{val}$ is large, which corresponds to large $n_a$ since vibrational deactivation is usually diffusion dominated. An explanation is thereby provided for our experimental observation that the laser output is improved by the addition of $H_2$ and He only on the higher side of the $CH_3F$ operating pressure range as can be seen in FIG. 2.

Now we turn to the case of more complex buffer molecules for which the vibrational degrees of freedom of the buffer molecules play an important role. We obtain an expression for the laser gain in the presence of a small amount of buffer gas of polyatomic molecules as $$\gamma = (G\Delta n_1/\beta_a n_1)\{1-[2+(n_{p1}\Delta f_t/\Delta n_1)](\beta_b/\beta_a)(n_b/n_a)$$
$$+ (n_{p1} - W_{pvv1}/h\nu_p)(\Delta f_t/\Delta n_1)(h\nu_p - \overline{H}_{al})$$
$$\cdot [\overline{H}_{b1}(\alpha_{aa}/\alpha_{ba}) - \overline{H}_{a1}(\alpha_{ab}/\alpha_{aa})](kT_{v1}^2 \overline{C}_{a1})^{-1}(n_b/n_a)$$
$$+ (W_p\tau_{vv1}/h\nu_p)(\Delta f_t/\Delta n_1)(\psi_b/\psi_1)(n_b/n_a)\}, \quad (6)$$

where retardation coefficients $\alpha_{xy}$'s are defined through the relations $$\tau_{va} \approx \tau_{Da} = \alpha_{aa} n_a + \alpha_{ab} n_b \quad (7a)$$

and $$\tau_{vb} \approx \tau_{Db} = \alpha_{ba} n_a + \alpha_{bb} n_b \quad (7b)$$

and represent the effect of $y$ molecules on the diffusion time $\tau_{Dx}$ of $x$ molecules. The coefficients $\psi_x$'s are defined through the relation $$\tau_{vv}^{-1} = \psi_a n_a + \psi_b n_b = \tau_{vv1}^{-1} + \psi_b n_b \quad (8)$$

and represent the contribution of $x$ molecules to the V—V transfer rate.

The second term inside the curly brackets in Equation (6) is identical to the corresponding term in Equation (3) and represents the negative contribution of increased line broadening and rotational relaxation to the laser gain. The third term represents the positive contribution to the laser gain by the extra vibrational heat content brought in by a buffer gas of complex molecules which lowers the vibrational temperature $T_\nu$. The expression suggests that in order to make this term large, it is desirable to have as large a vibrational heat content $\bar{H}_{b1}$ as possible. However, large $\bar{H}_{b1}$ implies complex and heavy buffer molecules, which are associated with large molecular sections and large $\alpha_{ab}$, $\alpha_{ba}$ and $\beta_b$, all of which are detrimental to the laser gain. Consequently, there is an optimum molecular size for the buffer gas. A good buffer molecule should have a large $\bar{H}_{b1}/\alpha_{ba}$ ratio which is roughly the ratio between the number of vibrational degrees of freedom and the molecular weight. This means molecules containing a large number of hydrogen atoms are good candidates. Our experimental data are consistent with these arguments and indicate $C_6H_{14}$ to be the heat among the buffer molecules we studied.

The third term inside the curly brackets also suggests that buffer gases are most useful when the $\bar{H}_{a1}/\alpha_{aa}$ ratio of the active molecules is small. Active molecules with large $\bar{H}_{a1}/\alpha_{aa}$ ratio are capable of efficient self-deactivation of vibrational energy and hence cannot be significantly improved by buffer gases.

The third term inside the curly brackets in Equation (6) is quite similar to the corresponding term in Equation (3). However, the factor $\tau_{wal}k_{ab}n_b$ (which is proportional to $n_a$) in Equation (3) is replaced by $(n_b n_a)$ in Equation (6). This change means that the positive effect of complex buffer molecules {Equation (6)} does not diminish with decreasing active gas density $(n_a)$ as rapidly as in the case of simple buffer molecules {Equation (3)}. This is borne out by our experimental data as shown in FIGS. 2–8. While the beneficial effects of some gases, such as He, are observed only for $CH_3F$ pressure in excess of 35 mTorr, the beneficial effects of $C_5H_{10}$ and $C_6H_{14}$ are seen to persist at $CH_3F$ pressures as low as 23 mTorr.

The last term in Equation (6) represents a positive contribution to the laser gain by the buffer gas due to the increased V—V transfer rate in its presence. To make this term large, $\psi_b$ must be large, which means the buffer molecule should have many vibrational states in near resonance with the pumped state P of the active molecule. This term is particularly important in pulsed operation when only fast V—V transfers have time to take place and the effective $\bar{H}_{b1}$ is small. The reason why experimentally $C_5H_{10}$ appears to be superior to $C_6H_{14}$ in pulsed operation is not clear. But, it is significant that $C_5H_{10}$ has two fundamental vibrational modes (not infrared-active) near 1000 cm$^{-1}$ which are in close resonance with the second harmonics of its $\nu_7$ mode (547 cm$^{-1}$), which in turn is in close resonance with the second harmonics of its $\nu_{23}$ mode (283 cm$^{-1}$). The downward redistribution of vibrational population can be very rapid due to these harmonic relations.

General Analysis

In summary, we have found ethane, cyclopentane, n-hexane to be useful buffer gases for an optically pumped $CH_3F$ laser. With approximately 1:1 mixture of $CH_3F$ and $C_6H_{14}$, the optimum $CH_3F$ partial pressure is about 100 percent higher than with pure $CH_3F$ and the output power is also more than 50 percent higher for the same pump power in cw operation. Similar improvements are also obtained in pulsed operation with 350-$\mu$sec pulses. Among the three gases, ethane has the advantage that it can be pumped out with a mechanical pump without a cold trap. Cyclopentane appears to be the best for pulsed operation, but it may not be suitable for lasers that are optically pumped in the 10.6-$\mu$m region due to the presence of an absorption band. n-Hexane seems to be the best all around buffer gas with negligible absorption in the 10 to 11 $\mu$m range. It has weak absorption bands in the 9 to 10 $\mu$m range, but did not cause any problem at 9.55 $\mu$m.

Although our results were obtained by using a 5 cm-bore Fabry-Perot resonator, the observed effects of buffer gases on the optimum active gas pressure and the maximum output power should be approximately the same for lasers using a smaller bore waveguide resonator. This is because in the absence of a buffer gas the optimum operating pressure would increase with the decreasing wave-guide diameter in such a way that the value of the diffusion time constant relative to all other collisional time constants remains approximately the same at the optimum pressure. Therefore, based on the theoretical understanding of our experimental results, the addition of a good buffer gas should bring about similar relative improvements on the output power and the operating pressure of the laser independent of the inside diameter of the resonator.

What is claimed is:

1. A gas laser comprising
a gaseous medium including as an active constituent a molecular gas having a vibrational-rotational transition and an electric dipole moment, in which gaseous medium the vibrational relaxation time of the active gas is greater than its rotational relaxation time for the vibrational and rotational states involved in the lasing process, means for exciting said vibrational-rotational transition so as to selectively invert the population of a pure rotational transition within said gas, means for stimulating the emission of radiation from said rotational transition and for extracting a portion of said radiation for utilization, characterized in that said gaseous medium includes a hydrocarbon vapor for reducing the vibrational relaxation time of the active gas, whereby the vibrational relaxation time of the active gas is reduced by the transfer of vibrational energy from the active gas to said hydrocarbon vapor, the partial pressure of which hydrocarbon vapor is in an order of magnitude range centered about a unity ratio to the partial pressure of the active gas.

2. A gas laser according to claim 1 in which said hydrocarbon vapor is of the type $C_mH_n$ where $n$ is an integer greater than or equal to $2m$.

3. A gas laser according to claim 1, in which the hydrocarbon vapor is n-hexane, $C_6H_{14}$.

4. A gas laser according to claim 1, in which the hydrocarbon vapor is ethane, $C_2H_6$.

5. A gas laser according to claim 1, in which the hydrocarbon vapor is cyclopentane, $C_5H_{10}$.

6. A gas laser according to claim 1, in which the active gas, $CH_3F$, is methyl fluoride, and the hydrocarbon vapor is n-hexane, $C_6H_{14}$.

* * * * *